United States Patent
Johnson et al.

(10) Patent No.: US 9,309,809 B2
(45) Date of Patent: Apr. 12, 2016

(54) EFFUSION PLATE USING ADDITIVE MANUFACTURING METHODS

(71) Applicant: General Electric Company, Schenectady, NY (US)

(72) Inventors: Thomas Edward Johnson, Greer, SC (US); Christopher Paul Keener, Woodruff, SC (US); Heath Michael Ostebee, Piedmont, SC (US); Daniel Gerritt Wegerif, Piedmont, SC (US)

(73) Assignee: General Electric Company, Schenectady, NY (US)

( * ) Notice: Subject to any disclaimer, the term of this patent is extended or adjusted under 35 U.S.C. 154(b) by 288 days.

(21) Appl. No.: 13/748,568

(22) Filed: Jan. 23, 2013

(65) Prior Publication Data

US 2014/0202163 A1   Jul. 24, 2014

(51) Int. Cl.
| | |
|---|---|
| F23R 3/00 | (2006.01) |
| F23R 3/04 | (2006.01) |
| F02C 7/00 | (2006.01) |
| B22F 5/00 | (2006.01) |
| F23R 3/28 | (2006.01) |
| B22F 3/105 | (2006.01) |
| F23R 3/10 | (2006.01) |
| B22F 3/10 | (2006.01) |

(52) U.S. Cl.
CPC .................. *F02C 7/00* (2013.01); *B22F 3/1055* (2013.01); *B22F 5/009* (2013.01); *F23R 3/04* (2013.01); *F23R 3/10* (2013.01); *F23R 3/283* (2013.01); *B22F 3/1035* (2013.01); *F23R 3/002* (2013.01); *F23R 2900/03041* (2013.01); *F23R 2900/03042* (2013.01)

(58) Field of Classification Search
CPC ............... F23R 3/002; F23R 3/04; F01K 9/64
See application file for complete search history.

(56) References Cited

U.S. PATENT DOCUMENTS

| | | | | |
|---|---|---|---|---|
| 4,684,323 | A * | 8/1987 | Field | 416/97 R |
| 6,282,905 | B1 | 9/2001 | Sato et al. | |
| 7,658,590 | B1 * | 2/2010 | Spanks | 415/115 |
| 7,789,626 | B1 * | 9/2010 | Liang | 416/97 R |
| 8,628,292 | B2 * | 1/2014 | Maltson | 415/115 |
| 2005/0135931 | A1 * | 6/2005 | Nakamata et al. | 416/97 R |
| 2005/0156361 | A1 * | 7/2005 | Holowczak et al. | 264/603 |
| 2008/0271457 | A1 * | 11/2008 | McMasters et al. | 60/754 |
| 2010/0263384 | A1 * | 10/2010 | Chila | 60/755 |
| 2011/0262695 | A1 | 10/2011 | Lee et al. | |
| 2015/0027127 | A1 * | 1/2015 | Clemen | 60/752 |

FOREIGN PATENT DOCUMENTS

| | | | | |
|---|---|---|---|---|
| EP | 1001221 A2 * | 5/2000 | | F23R 3/00 |
| EP | 1686240 A1 * | 8/2006 | | F01D 5/18 |

\* cited by examiner

*Primary Examiner* — Phutthiwat Wongwian
*Assistant Examiner* — Rene Ford
(74) *Attorney, Agent, or Firm* — Fletcher Yoder, P.C.

(57) ABSTRACT

Additive manufacturing techniques may be utilized to construct effusion plates. Such additive manufacturing techniques may include defining a configuration for an effusion plate having one or more internal cooling channels. The manufacturing techniques may further include depositing a powder into a chamber, applying an energy source to the deposited powder, and consolidating the powder into a cross-sectional shape corresponding to the defined configuration. Such methods may be implemented to construct an effusion plate having one or more channels with a curved cross-sectional geometry.

15 Claims, 5 Drawing Sheets

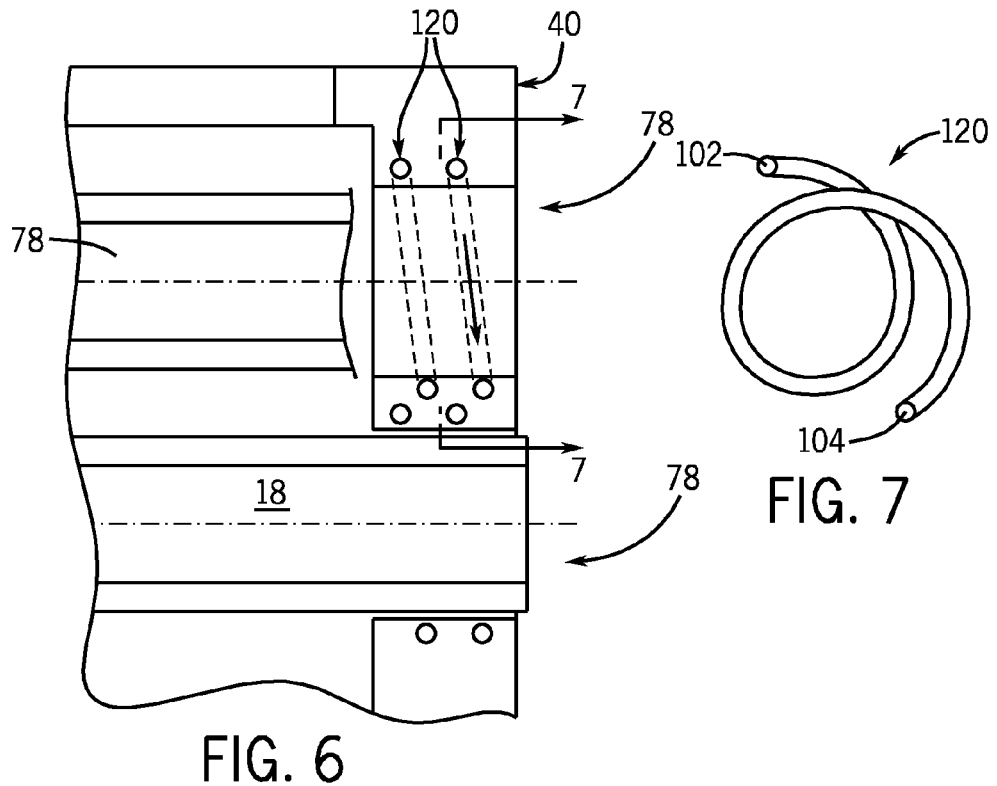
FIG. 6
FIG. 7
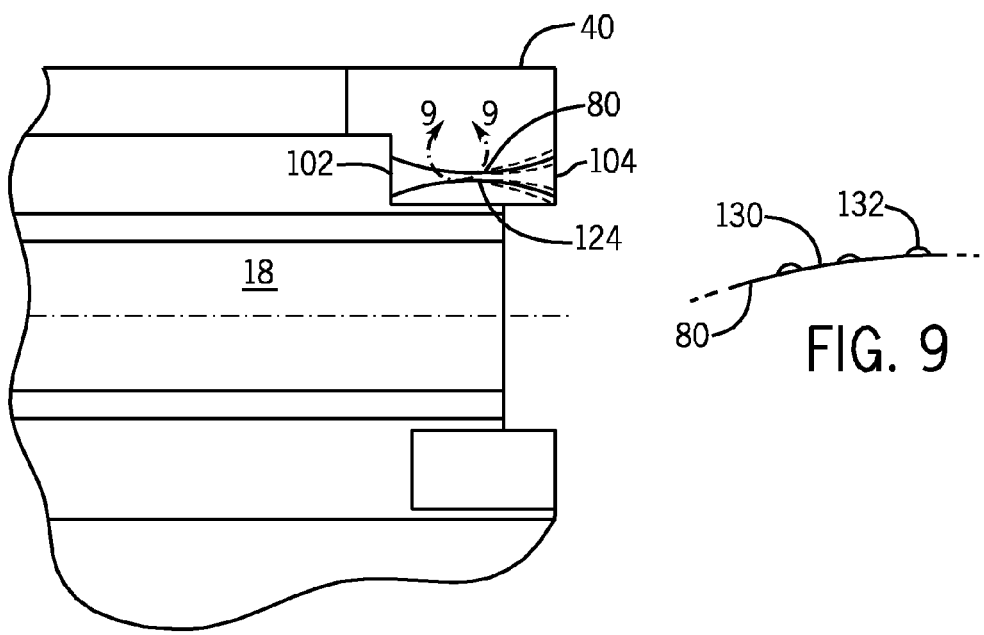
FIG. 8
FIG. 9

EFFUSION PLATE USING ADDITIVE MANUFACTURING METHODS

STATEMENT REGARDING FEDERALLY SPONSORED RESEARCH & DEVELOPMENT

This invention was made with Government support under contract number DE-FC26-05NT42643 awarded by the Department of Energy. The Government has certain rights in the invention.

BACKGROUND OF THE INVENTION

The subject matter disclosed herein relates generally to turbine combustors, and, more particularly to a structure configured to provide cooling within turbine combustors.

A gas turbine engine combusts a fuel-air mixture in a combustion chamber of a turbine combustor, and then drives one or more turbines with the resulting hot combustion gas. In such systems, the combustor generates a significant amount of heat. This heat can cause thermal expansion, as well as wear or potential damage to various components within the system. In some gas turbine engines, a head end of the combustor includes one or more fuel nozzles, which provide fuel and air for combustion in a combustion chamber. Unfortunately, the high temperatures of combustion can cause thermal expansion of portions of the combustor, including the fuel nozzles. This thermal expansion can lead to reduced performance, stress, cracks, and other problems.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method of manufacturing an effusion plate is provided. The method includes defining a configuration for the effusion plate, wherein the configuration has one or more internal cooling channels positioned within the effusion plate. The method further includes depositing a powder into a chamber, applying an energy source to the deposited powder, and consolidating the powder into a cross-sectional shape corresponding to the defined configuration.

In a second embodiment, a turbine combustor includes a combustion chamber, a head end portion, and an effusion plate positioned between the combustion chamber and the head end portion. Furthermore, the effusion plate has a proximal face, a distal face, and one or more channels extending between the proximal and distal face. The one or more channels also have a curved cross-sectional geometry.

In a third embodiment, a system having an effusion plate is provided. The effusion plate has a proximal face, a distal face, and one or more channels extending between the proximal face and the distal face. The one or more channels also have a curved cross-sectional geometry.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 6 is a cross-sectional side view schematic of an embodiment of the effusion plate having curved channels positioned circumferentially about fuel nozzles;

FIG. 7 is a plan view schematic of the embodiment of the curved channel of FIG. 6, taken within 7-7;

FIG. 8 is a cross-sectional side view of an embodiment of the effusion plate of FIG. 2 having a tapered channel with a plurality of turbulators positioned within the channel;

FIG. 9 is a cross-sectional side view schematic of the tapered channel of FIG. 8, taken within 9-9, illustrating the plurality of turbulators within the channel.

DETAILED DESCRIPTION OF THE INVENTION

Figure 1:
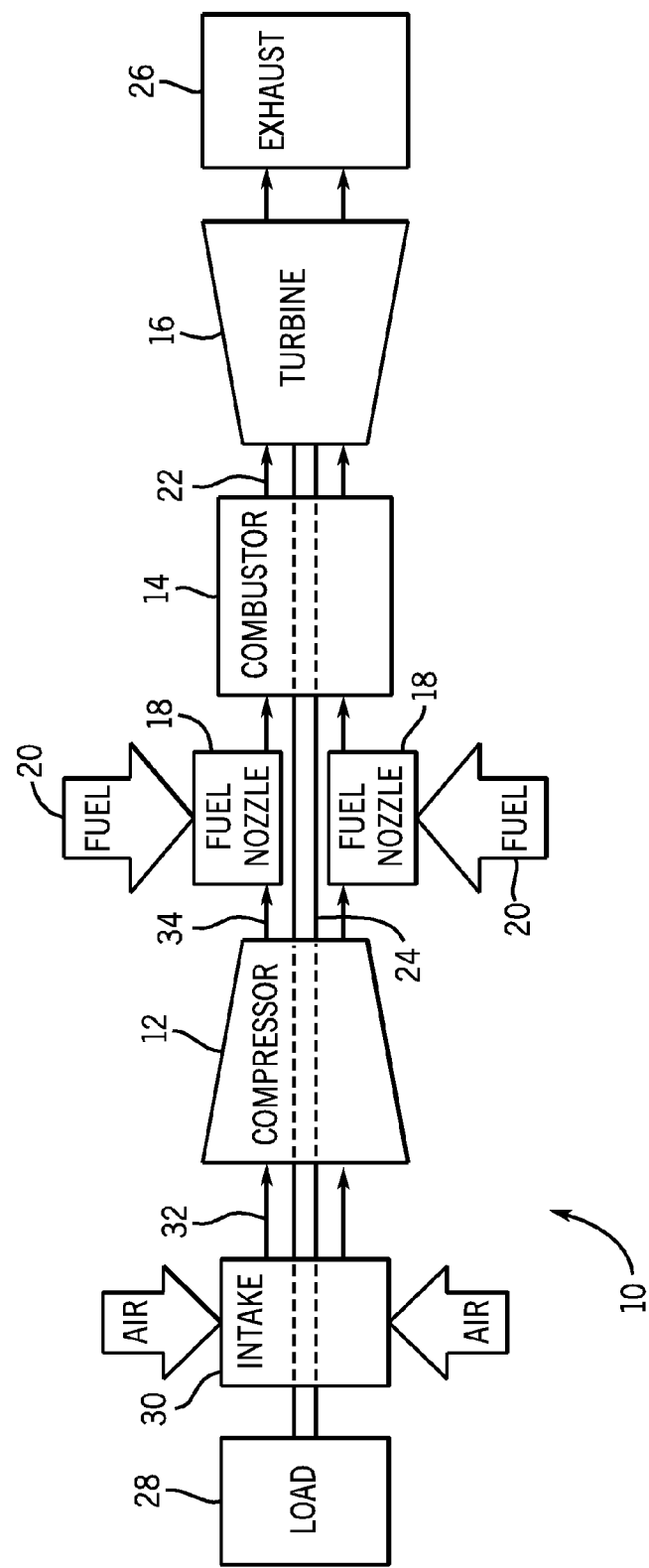
FIG. 1 is a schematic of an embodiment of a gas turbine system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Gas turbine engines may include an effusion plate for purposes of cooling in the combustor, e.g., in a cap between a head end and a combustion chamber of the combustor. Such effusion plates may be configured to provide effusion cooling, which involves cooling by flowing cooling air through a plurality of relatively small, closely spaces holes. Some effusion plates may include holes to enhance cooling (e.g., in the head end, such as the cap) and to reduce thermal degradation resulting from the combustion of gases in the combustion chamber. The holes may be formed by drilling them in the effusion plate; thus, the holes are limited to straight geometries. Unfortunately, holes produced in this manner have limited cooling effects and therefore may be inadequate. Thus, the present disclosure provides embodiments of an effusion plate manufactured via additive manufacturing techniques. Using such techniques, the effusion plates so produced may have one or more structural features that are configured to provide increased cooling. Examples of such structural features include, but are not limited to, curved cooling channels, tapered inlets and outlets for cooling channels, or turbulators within cooling channels. An effusion plate having the structural features described herein may use less air to provide adequate cooling to the system, which in turn may provide various advantages, such as lower emissions and more efficient combustion. For example, the disclosed structural features may increase the surface area, residence time, and overall cooling performance of the effusion plate.

Effusion plates of the present disclosure may be manufactured via additive manufacturing techniques. Such techniques generally provide the capability to construct complex solid objects from computer models, without difficult machining steps. In general, additive manufacturing techniques involve applying a source of energy, such as a laser or electron beam, to deposited powder layers in order to grow a part having a particular shape and features.

Turning to the drawings, FIG. 1 illustrates a block diagram of an embodiment of a gas turbine system 10, which may include an effusion plate in accordance with the present embodiments. The system 10 includes a compressor 12, a turbine combustor 14, and a turbine 16. The turbine combustors 14 may include one or more fuel nozzles 18 configured to receive a liquid fuel and/or gas fuel 20, such as natural gas or syngas.

The turbine combustors 14 ignite and combust a fuel-air mixture, and then pass hot pressurized combustion gases 22 (e.g., exhaust) into the turbine 16. Turbine blades are coupled to a shaft 24, which is also coupled to several other components throughout the turbine system 10. As the combustion gases 22 pass through the turbine blades in the turbine 16, the turbine 16 is driven into rotation, which causes the shaft 24 to rotate. Eventually, the combustion gases 22 exit the turbine system 10 via an exhaust outlet 26. Further, the shaft 24 may be coupled to a load 28, which is powered via rotation of the shaft 24. For example, the load 28 may be any suitable device that may generate power via the rotational output of the turbine system 10, such as an electrical generator, a propeller of an airplane, and so forth.

Compressor blades may be included as components of the compressor 12. The blades within the compressor 12 are coupled to the shaft 24, and will rotate as the shaft 24 is driven to rotate by the turbine 16, as described above. An intake 30 feeds air 32 into the compressor 12, and the rotation of the blades within the compressor 12 compress the air 32 to generate pressurized air 34. The pressurized air 34 is then fed into the fuel nozzles 18 of the turbine combustors 14.

The fuel nozzles 18 mix the pressurized air 34 and fuel 20 to produce a suitable mixture ratio for combustion (e.g., a combustion that causes the fuel to more completely burn) so as not to waste fuel or cause excess emissions. Notably, certain gas turbine systems may have a plurality of separate premixing tubes configured to receive and mix the fuel 20 and the pressurized air 34. In some embodiments, such premixing tubes may be housed within the fuel nozzle 18, although in some systems, the premixing tubes may be used in lieu of the fuel nozzle 18. In other words, each premixing tube may be independently suspended within a head end chamber and not housed or grouped within a fuel nozzle 18.

Figure 2:
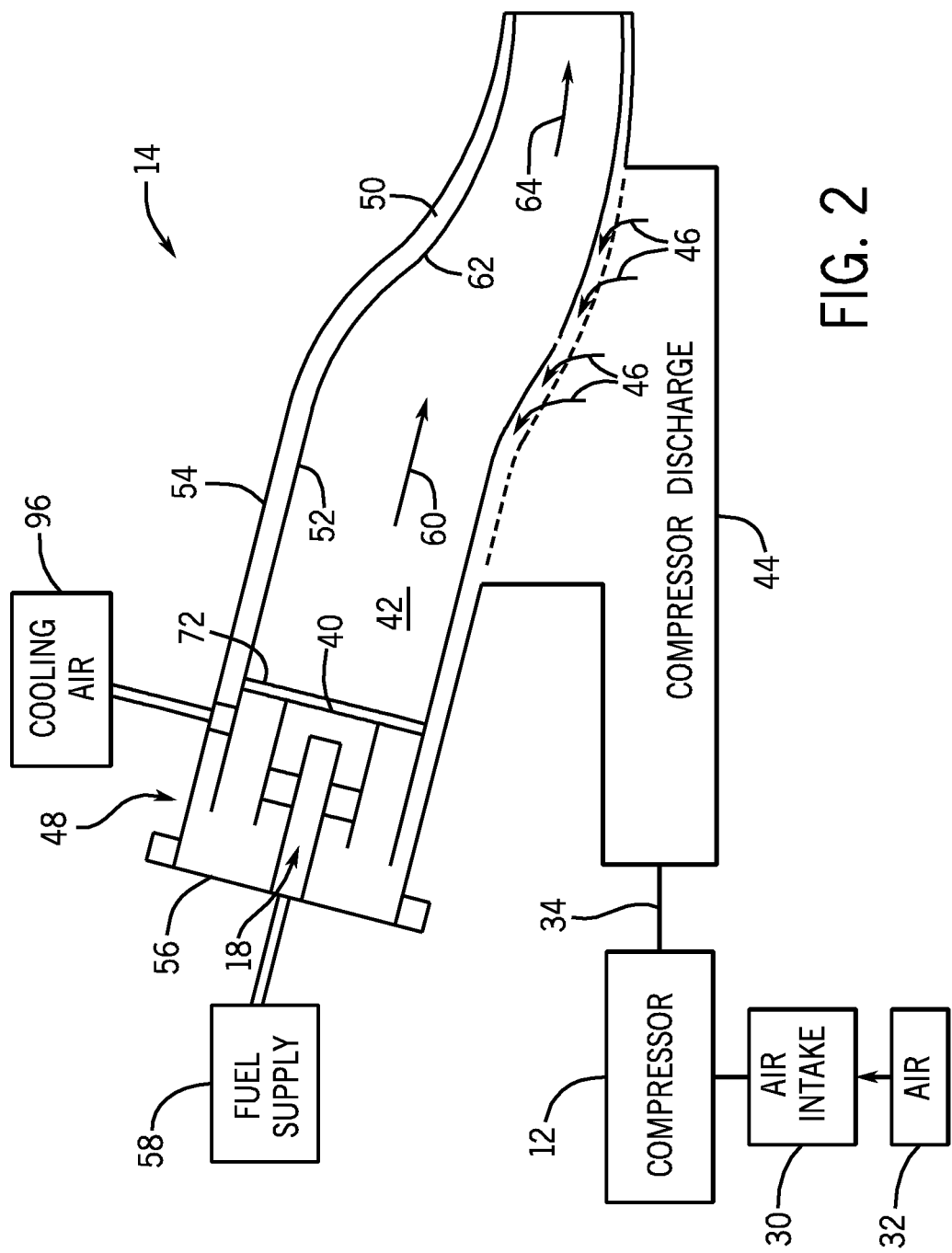
FIG. 2 is a cross-sectional side view of the turbine combustor of FIG. 1, illustrating an embodiment of an effusion plate positioned adjacent to a combustion chamber.

FIG. 2 is a schematic of an embodiment of the turbine combustor 14 of FIG. 1, illustrating an effusion plate 40 positioned adjacent to a combustion chamber 42. As described above, the compressor 12 receives the air 32 from the air intake 30, compresses the air, and produces the flow of pressurized air 34 for use in the combustion process within the turbine combustor 14. As shown in the illustrated embodiment, the pressurized air 34 is received by a compressor discharge 44 that is operatively coupled to the turbine combustor 14. As indicated by arrows 46, the pressurized air 34 flows from the compressor discharge 44 toward a head end 48 of the turbine combustor 14. More specifically, the pressurized air 34 flows through an annulus 50 between a liner 52 and a flow sleeve 54 of the turbine combustor 14 to reach the head end 48.

In certain embodiments, the head end 48 includes an end plate 56 that may support the one or more fuel nozzles 18 depicted in FIG. 1. Additionally, a fuel supply 58 may be coupled to the end plate 56 and may provide fuel 20 to the fuel nozzles 18. Pressurized air 34 from the annulus 50 of the turbine combustor 14 may also be delivered to the fuel nozzles 18, and the fuel 20 with the pressurized air 34 may be combined within the fuel nozzles 18 to form a fuel-air mixture. After the fuel and air are mixed, the fuel-air mixture flows downstream from the head end 48 into the combustion chamber 42 where the fuel-air mixture is ignited and combusted to form combustion gases (e.g., exhaust). The combustion gases flow in a direction 60 toward a transition piece 62 of the turbine combustor 14. The combustion gases pass through the transition piece 62, as indicated by arrow 64, toward the turbine 16, where the combustion gases drive the rotation of the blades within the turbine 16.

As noted above, combustion of the fuel-air mixture results in high temperatures within the combustion chamber 42 compared to other portions of the gas turbine engine 10. For example, combustion may result in temperatures ranging from approximately 2000° to 3000° or more Fahrenheit. Again the effusion plate 40 produced in accordance with the present disclosure may be used to protect the head end 48 (e.g., including the fuel nozzles 18) from the heat generated at the combustion chamber 42. The effusion plate 40 may be configured to provide cooling within the combustor 14 through the use of one or more channels or features having geometries that provide relative large internal surface areas for improved convective cooling compared to substantially straight channels.

The effusion plate 40 of the present disclosure may generally separate the head end 48 from the combustion chamber 42. More specifically, the effusion plate 40 may be positioned on or within a cap assembly 72 adjacent to the combustion chamber 42. In some embodiments, however, the effusion plate 40 may be a stand-alone structure positioned adjacent to the combustion chamber 42. The effusion plate 40 may generally be configured to at least partially surround and/or support the downstream end of the fuel nozzles 18, thereby enabling flow of the fuel-air mixture from the fuel nozzles 18 into the combustion chamber 42. Additionally, the effusion plate 40 described herein may be disposed within, be integrated into, or extend along a wall of any of the components of the combustion system. Thus, in some embodiments, additive manufacturing techniques may be utilized to construct the effusion plate 40 and/or the various cooling features described below (e.g., cooling channels having various curvatures, angled inlets and outlets, and so forth) on or within a variety of other components or surfaces of the combustion system to provide cooling. For example, in some embodiments, the effusion plate 40 and/or the cooling features (e.g., cooling channels and the like) may be constructed on or within the combustor cap, the fuel nozzle, the turbine blade, the combustor liner, the transition piece, and so forth. In some embodiments, a combustor cap, a combustor wall, the fuel nozzle, a turbine vane, a turbine shroud, or any combination thereof, may be configured to have or be coupled to the effusion plate 40.

The effusion plate 40 described herein may be manufactured from any of a variety of materials. In some embodiments, the effusion plate 40 may be manufactured from a corrosion resistant metal alloy, such as a nickel-based alloy or a chrome-based alloy. More specifically, in some embodiments, the effusion plate may be manufactured from INCONEL 617 or INCONEL 718 (nickel-based alloys, manufactured by Special Metals Corporation), cobalt chrome, or other similar alloys. Additionally, any other materials capable of being constructed and shaped by an additive manufacturing process may be utilized. For example, stainless steel and titanium may be utilized in construction of the effusion plate 40, as these materials are available as a powder (e.g., either commercially or post-processing) and can be processed into particular structures via additive manufacturing techniques. By way of additional examples, various ceramics and composites may be utilized in construction of the effusion plate 40. Various combinations of materials are also contemplated in the structure of the effusion plate 40.

Figure 3:
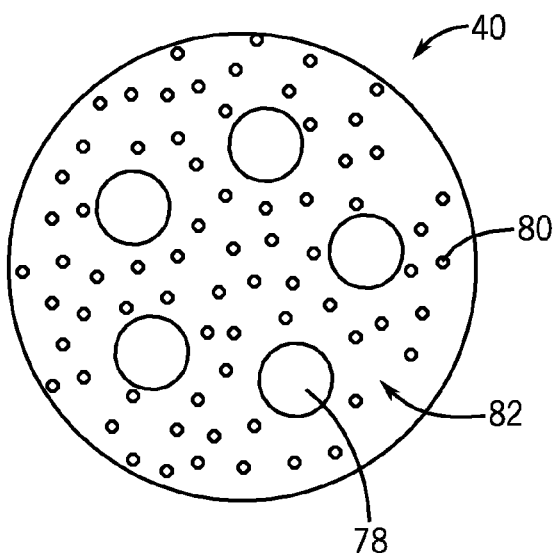
FIG. 3 is a front view of an embodiment of the effusion plate of FIG. 2 having a plurality of cooling holes produced in accordance with the present disclosure.

FIG. 3 is a front view of an embodiment of the effusion plate 40, in accordance with the present disclosure. The effusion plate 40 may be generally circular in shape, though any shape is presently contemplated. As depicted, the effusion plate 40 may include one or more openings 78 for receiving a downstream end of a corresponding number of fuel nozzles 18, and the fuel nozzles 18 may pass through the openings 78 of the effusion plate 40 into the combustion chamber 42. In the illustrated embodiment, the effusion plate 40 surrounds and/or supports five fuel nozzles 18, although the effusion plate 40 may be configured to accommodate any number of fuel nozzles 18.

As noted above, the effusion plates 40 of the present disclosure may alternatively be configured to be incorporated into premixing turbine systems having one or more premixing tubes extending through the one or more fuel nozzles 18 (e.g., 2 to 1000 tubes may extend through a fuel nozzle). For example, each premixing tube may receive both fuel 20 and air 22, and premix the fuel 20 and air 22 in the respective mixing tube. Furthermore, each mixing tube may be approximately 0.25 to 5, 0.5 to 4, 0.75 to 3, or 1 to 2 centimeters in diameter. The effusion plates 40 described herein may alternatively be incorporated into various systems having one or more separate premixing tubes extending between the end plate 56 and the combustion chamber 42 (FIG. 2). In such premixing systems, the plurality of openings 78 within the effusion plate 40 may be configured (e.g., have a size and shape) to receive a downstream end of a corresponding number of premixing tubes. The effusion plate 40 may generally surround and/or support an end of each premixing tube, allowing the fuel-air mixture to be deposited into the combustion chamber 42 in a suitable ratio for optimal combustion, emissions, fuel consumption, and power output.

In accordance with the present disclosure, additive manufacturing methods may be utilized to construct the effusion plate 40 including openings 78 for receiving fuel nozzles and/or premixing tubes, and additionally including one or more channels 80 arranged in an area 82 around and between the openings 78 to promote cooling during the combustion of gases in the adjacent combustion chamber 42. In some embodiments, the channels 80 may receive a portion of the pressurized air 34 from the head end 48 and/or cooling air provided via a separate inlet within the combustor and/or exhaust so as to efficiently cool the effusion plate 40. The channels 80 may be arranged within the effusion plate in any of a variety of ways. For example, the channels 80 may be spread evenly or substantially evenly throughout the effusion plate 40, such as in FIG. 3. However, in some embodiments, the channels 80 may be concentrated in a central portion of the effusion plate 40 or any area of the effusion plate 40 that may experience relatively high temperatures. As another example, the channels 80 may be clustered or concentrated around each of the openings 78.

Figure 4:
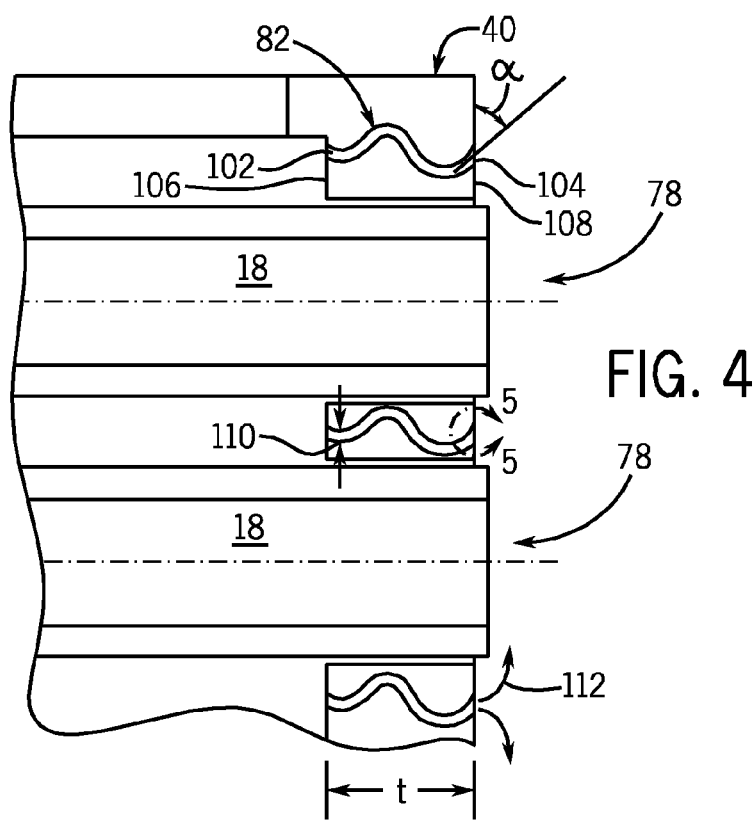
FIG. 4 is a cross-sectional side view of an embodiment of the effusion plate of FIG. 2 having curved channels formed in accordance with the present disclosure.

Effusion plates 40 produced in accordance with the additive manufacturing methods of the present disclosure may incorporate various cooling features having curved or asymmetrically shaped geometries, and examples of such features are described in more detail below. FIG. 4 illustrates a cross-section of one embodiment of the effusion plate 40 having curved channels 82 (e.g., oscillating, wave-like, or generally curving channels) that may be formed via an additive manufacturing process. The curved channels 82 may have 1, 2, 3, 4, 5, 6, 7, 8, 9, 10, or more curved portions, such as upper and lower curves. The channels 82 also may include zigzagging or angled portions. Specifically, the effusion plate 40 may be configured to have one or more curved channels 82 having an inlet 102 and/or an outlet 104. In some embodiments, about 10, 100, 1000, 2000, 3000, or more curved channels 82 may be positioned within the effusion plate 40. In some embodiments, the walls defining the curved channels 82 may be annular, so as to form substantially cylindrically-shaped curved channels 82 extending between a proximal face 106 and a distal face 108 of the effusion plate 40. The curved channels 82 may be generally serpentine or tortuous in shape, as illustrated in the embodiment of FIG. 4. For example, the channels 82 may have a curved cross-sectional geometry 106 when a cross-section 108 is taken along a plane extending between a proximal face and distal face of the effusion plate 40. Furthermore, the curved channels 82 may have bends or curves oriented in one or more planes within the effusion plate. While the embodiment illustrated in FIG. 4 is presented in the context of the curved channels 82, any geometry may be suitable for the channels 80. Various other geometries are contemplated, including any configurations that provide increased surface area within the channels 80 so as to increase heat transfer between the pressurized air 34 and the effusion plate 40 as pressurize air 34 or exhaust flows through the channels 80. While any size or geometry is presently contemplated, a diameter 110 of interior portions of the channels 80 may generally range from approximately 0.01 centimeters to approximately 0.5, or more, centimeters. Although in some embodiments, the diameter 110 may be from about 0.02 to about 0.3, or about 0.1 to about 0.2 centimeters. Furthermore, as discussed below, the diameter 110 may change along the length of the channels 80 so as to provide a tapered geometry.

Additive manufacturing techniques may also allow for construction of a relatively thick effusion plate 40, which may allow for increased protection and cooling. In general, a relatively thick effusion plate may allow for each channel 80 to have a longer length and/or a higher ratio of length to diameter (L/D), allowing for more heat to be transferred due to the increased surface area within the channel 80. Thus, in some embodiments, additive manufacturing techniques may be used to construct relatively thick effusion plates having channels 80 with high L/D values and increased surface area for heat transfer. More specifically, the effusion plate 40 of the present disclosure may generally have a thickness of from about 0.1 to about 1, or more, centimeters. In some embodiments, the effusion plate 40 may have a thickness of from about 0.1 to about 0.8, or from about 0.3 to about 0.7, or from about 0.4 to about 0.6 centimeters. The channels 80 may generally extend between the distal face 108 and the proximal face 106 of the effusion plate 40, or in other words the channels 80 may generally extend across the thickness of the effusion plate 40. Additionally, additive manufacturing techniques may allow for curved channels 80 such that the length of the channels 80 is larger than the thickness t of the effusion plate 40. For example, the length of the channels 80 may be at least 1%, 10%, 20%, 50%, or larger than the thickness t. More specifically, the channels 80 may be between 10% and 500% larger, 20% to 400% larger, 25% to 300% larger, or any suitable percentage larger than the thickness t of the effusion plate 40.

Figure 5:
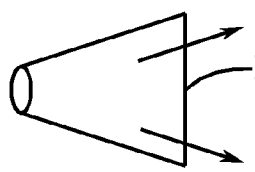
FIG. 5 is a side view schematic of an embodiment of an outlet of the channels of FIG. 4, taken within region 5-5.

Furthermore, in some embodiments, additive manufacturing techniques may allow the inlet 102 and/or outlet 104 to have any of a variety of configurations. Referring now to FIG. 5, which is an expanded view of the inlets 102 and the outlets 104 of the effusion plate 40, the inlets 102 and/or outlets 104 may be circular, square, elliptical, or any other suitable shape. In some embodiments, for example, one or more channels 80 is configured to expand radially outwardly (e.g., diverge) at the inlet 102 and/or outlet 104, such that the diameter of the inlet 102 and/or outlet 104 is greater than the diameter of an interior portion of the channel 80 within the effusion plate 40. An expanded outlet 104, such as the outlet 104 shown in FIG. 5, may provide for increased film cooling, for example. For example, as depicted in FIG. 4, such a tapered geometry may enhance air flow along the distal face 108 of the effusion plate 40, illustrated by curved arrows 112. While any suitable size is presently contemplated, the diameter of the inlets 102 or outlets 104 may generally range from about 0.02 to about 1, or more, centimeters. Although in some embodiments, the diameter of the inlets and outlets may be from about 0.05 to about 0.8, or about 0.1 to about 0.5 centimeters.

Additionally, as shown in FIG. 4, one or more of the inlets 102 and/or outlets 104 may be positioned at an angle α relative to the proximal face 106 or distal face 108 of the effusion plate 40 when additive manufacturing techniques are utilized. For example, the inlets 102 and/or outlets 104 may receive or pass air out of the channels 80 at an angle of between approximately 90 degrees and 5 degrees, 80 degrees and 10 degrees, 70 degrees and 20 degrees, 60 degrees and 30 degrees, or 50 degrees and 40 degrees relative to the proximal face 106 or distal face 108. In some embodiments, the inlets 102 and/or outlets 103 may receive or pass air out of the channels 80 at an angle of approximately 90, 80, 70, 60, 50, 40, 30, and/or 20 degrees relative to the proximal face 106 or distal face 108. In another embodiment, the inlets 102 and/or outlets 104 may be positioned at an angle of approximately less than about 45 degrees relative to the proximal face 106 or distal face 108, respectively. Alternatively, each inlet 102 and/or outlet 104 may be positioned at an angle of about less than 20 degrees relative to the proximal face 106 or distal face 108, respectively. Furthermore, the various inlets 102 and/or outlets 104 within the effusion plate 40 may be positioned at different angles relative to one another. In some embodiments, the inlets 102 and/or outlets 104 may be angled so as to create converging or diverging air flow, for example.

Furthermore, in some embodiments, when the effusion plate 40 is formed via an additive manufacturing process, the interior walls of the channels 80 may be substantially smooth, especially when compared to straight channels formed via laser or water jet techniques which may leave charred or roughened pieces or unpredictable or irregular holes. However, in some embodiments, the interior walls of the channel 80 may be striated. The striations may be about 20 microns thick, although the striations may range from about 5 microns to 30 microns. The striations may also extend longitudinally or circumferentially along the interior wall of the channels 80, and may be formed as a result of multiple metal powder layers being consolidated together during the additive manufacturing process.

FIGS. 6 and 7 illustrate an embodiment formed via additive manufacturing techniques in which annular channels 120 generally surround, or wrap around, a fuel nozzle 18 (e.g., a premixing tube). As shown in FIG. 7, each of the channels 120 may be substantially spiral or helically shaped, such that they are circumferentially disposed about the openings 78. In FIG. 6, each of the channels 120 wraps circumferentially around the fuel nozzle 18 (i.e., the opening 78) two times, although in other embodiments the channels 120 may wrap around the fuel nozzle 18 1, 2, 3, 4, 5, 6, 7, 8, 9, 10, or more times between the proximal face 106 and distal face 108 of the effusion plate 40. Furthermore, additional curvatures, twists, and features may be incorporated along the length of each of the annular channels 120. Again, although FIG. 6 illustrates the channels 120 as surrounding one fuel nozzle 18 (e.g., premixing tube), in some premixing systems, such annular channels 120 may directly surround, or wrap around, a plurality of premixing tubes. By way of example, fuel nozzles 18 may be in the range of from about 7 to about 20 centimeters in diameter, while premixing tubes may be smaller—from about 0.5 to about 2 centimeters in diameter. Thus, it is presently contemplated that the channels 120 may be suitably configured to wrap around larger fuel nozzles 18, or to surround smaller premixing tubes (e.g., a single premixing tube or a group of 2 to 100, 3 to 50, or 4 to 25 premixing tubes).

FIG. 8 illustrates another embodiment of the effusion plate 40 produced in accordance with the additive manufacturing processes of the present disclosure. As depicted, in certain embodiments, each channel 80 may generally taper between the proximal face 106 and distal face 108 of the effusion plate 40. By way of example, the diameter at the inlet 102 may be greater than the diameter of an interior portion of the channel 80 within the effusion plate 40. Such tapering may be desirable for accelerating air through the channel 80, resulting in enhanced heat transfer. In some embodiments, the channel 80 may taper gradually along the entire length of the channel 80, such that the inlet 102 has the largest diameter within the channel 80, while the outlet 104 has the smallest diameter within the channel 80. However, in other embodiments, as indicated in FIG. 8, it may be desirable to taper the channel 80 from the inlet 102 to a point 124 (e.g., a midpoint) within the channel 80, and also provide a flared, or radially expanded outlet 104. In this manner, the channel 80 may have a venturi shaped passed. Some embodiments may have alternating tapered and radially expanded portions, such that the cross-sectional diameter varies along the length of the channel 80. Other configurations having various tapered portions and expanded portions along the length of the channel 80 are envisioned, as depicted by the dashed lines.

FIG. 9 is an expanded view of an interior wall 130 of the channel 80 taken within lines 9-9 of FIG. 8. As illustrated, additive manufacturing processes may be utilized to construct the interior wall 130 having various features configured to affect the flow of air through the channel 80. For example, one or more turbulators 132 may be positioned at various locations on the interior wall 130. The turbulators 132 may have any configuration that affects air flow, such as, for example, random protrusions in one or more lines arranged axially along the length of the channel 80, or in one or more lines arranged circumferentially within the channel 80. Furthermore, the turbulators 132 may be of any suitable size, and each channel 80 may have turbulators of one or more different sizes. By way of non-limiting example, each turbulator 132 may independently have a cross-sectional geometry that is triangular, rectangular, square, semi-circular, ellipsoidal, or the like. These turbulators 132 may help to increase the surface area for convective heat transfer (e.g., like small heat transfer fins) and/or the turbulators 132 may help induce mixing or turbulent flow in the channels 80. Again, the increased surface area and mixing improves the heat transfer, and thus cooling.

Furthermore, the channels 80 produced using additive manufacturing techniques may, in some embodiments, have different configurations within the same effusion plate 40. For example, one or more tapered channels 80 and one or more helically shaped channels 80, such as the channels 120 illustrated in FIG. 7, may be incorporated into the effusion plate 40. In other embodiments, one or more channels 80 may connect within the interior of the effusion plate 40. For example, two helically shaped channels 80 surrounding adjacent fuel nozzles 18 may intersect, enabling air to flow between the connected channels 80. In certain embodiments, one or more of the channels 80 may also be configured to branch or split between the proximal face 106 and distal face 108 of the effusion plate 40. For example, in one embodiment, the channel 80 may branch into two or more different branches within the effusion plate 40. The branches may connect to two or more different outlets 104 on the distal face 108 of the effusion plate 40, or alternatively the branches may converge together so as to connect to one outlet 104.

As noted above, additive manufacturing techniques generally allow for construction of custom parts having complex geometries, curvatures, and features, such as the cooling channels 80 discussed herein. Accordingly, additive manufacturing may be used to construct effusion plates having a variety of shapes and features, such as cooling channels 80, which are impractical or cannot be made using conventional techniques, such as laser or water jet machining techniques.

Figure 10:
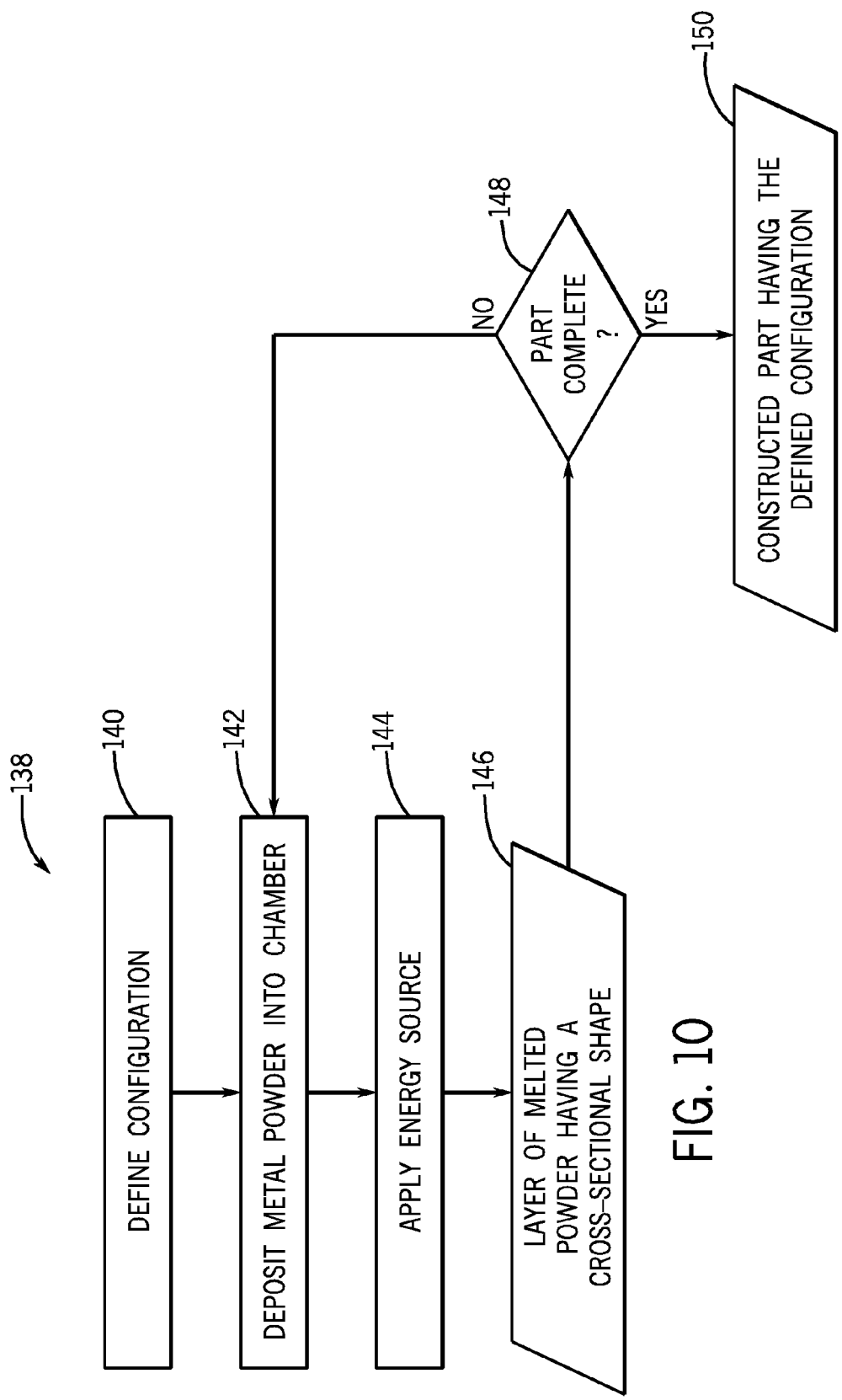
FIG. 10 is a flowchart depicting an embodiment of an additive manufacturing method for producing the effusion plate in accordance with the present disclosure.

Additive manufacturing may be particularly useful in the construction of an effusion plate 40 for a gas turbine system, as the effusion plate 40 may be constructed from high-strength materials that may be difficult to machine or tool using traditional methods. In addition, additive manufacturing techniques provide the capability to construct complex solid objects from computer models, without difficult machining steps. In general, additive manufacturing techniques involve applying a source of heat, such as a laser or electron beam, to deposited powder layers (e.g., layer after layer) in order to grow a part having a particular shape. FIG. 10 is a block diagram illustrating an embodiment of a method 138 for constructing an effusion plate (e.g., effusion plate 40) using additive manufacturing techniques. The method 138 may be performed by an additive manufacturing system, with the acts described herein being performed by a computer. The method 138 includes defining a particular configuration (block 140). The configuration may be programmed into an additive manufacturing system by using a specialized or general purpose computer, for example. In some embodiments, the model may be for an effusion plate (e.g., effusion plate 40) having a plurality of internal cooling channels (e.g., channels 80), wherein each channel has a complex shape. The defined configuration may have any of the shapes and features described above. For example, the shape may be curved, circular/spiral, or a radially expanded inlet 102 and/or outlet 104. In step 142, a powder (e.g., a metal, ceramic, or composite powder) is deposited into a chamber, such as a vacuum chamber. Any of a variety of materials may used in any suitable combination, including those described in detail above with respect to FIG. 2. In step 144, an energy source, such a laser or electron beam, for example, is applied to the deposited metal powder. The laser or electron beam melts or otherwise consolidates the powder into a layer having a cross-sectional shape 146 corresponding to the configuration defined in step 140. A computer or operator may determine whether the part is incomplete or complete, in step 148. If the part is incomplete, then steps 142 and 144 are repeated to produce layers of consolidated powder having cross-sectional shapes 146 corresponding to the defined confirmation or model until construction of the part is complete. In other words, the energy source is applied to melt or otherwise consolidate each newly deposited powder layer until the final product is complete and an effusion plate having the defined configuration is produced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A turbine combustor, comprising:
a combustion chamber;
a head end portion; and
an effusion plate positioned between the combustion chamber and the head end portion, the effusion plate comprising:
a proximal face;
a distal face; and
one or more channels extending between the proximal face and the distal face, wherein the one or more channels comprise a serpentine cross-sectional geometry, wherein the cross-section is taken along a plane extending between the proximal face and distal face.

2. The turbine combustor of claim 1, wherein the one or more channels comprise a radially expanded outlet.

3. The turbine combustor of claim 1, wherein the one or more channels comprise a radially expanded inlet.

4. The turbine combustor of claim 1, wherein the one or more channels have curves oriented in multiple planes within the effusion plate.

5. The turbine combustor of claim 1, wherein a length of the one or more channels is at least 50 percent larger than a thickness of the effusion plate.

6. The turbine combustor of claim 1, wherein a first channel of the one or more channels comprises a first outlet oriented at a first angle of less than 90 degrees with respect to the distal face of the effusion plate, a second channel of the one or more channels comprises a second outlet oriented at a second angle of less than 90 degrees with respect to the distal face of the effusion plate, and the first angle and the second angle are different from one another.

7. The turbine combustor of claim 1, wherein an interior wall of the one or more channels is striated.

8. The turbine combustor of claim 1, wherein the head end portion is upstream from the combustion chamber and comprises one or more fuel nozzles configured to provide fuel to the combustion chamber.

9. A system, comprising:
an effusion plate configured to be attached to a turbine combustor and positioned between a combustion chamber and a head end portion of the turbine combustor, comprising:

a proximal face;

a distal face; and one or more channels extending between the proximal face and the distal face, wherein the one or more channels comprise a curved cross-sectional geometry such that the one or more channels intersect a plane extending between the proximal face and distal face multiple times, wherein the plane is perpendicular to the proximal face or the distal face.

10. The system of claim 9, wherein the one or more channels comprise a radially expanded outlet.

11. The system of claim 9, wherein the one or more channels comprise an outlet oriented at an angle of less than 90 degrees with respect to the distal face of the effusion plate.

12. The system of claim 9, wherein the one or more channels have curves oriented in multiple planes within the effusion plate.

13. The system of claim 9, wherein a length of the one or more channels is at least 50 percent larger than a thickness of the effusion plate.

14. The system of claim 9, wherein a first channel of the one or more channels comprises a first outlet oriented at a first angle of less than 90 degrees with respect to the distal face of the effusion plate, a second channel of the one or more channels comprises a second outlet oriented at a second angle of less than 90 degrees with respect to the distal face of the effusion plate, and the first angle and the second angle are different from one another.

15. The system of claim 9, wherein the one or more channels are concentrated in a central portion of the effusion plate.

\* \* \* \* \*